United States Patent [19]

Burrafato et al.

[11] Patent Number: 5,532,211
[45] Date of Patent: Jul. 2, 1996

[54] AQUEOUS DRILLING MUDS FLUIDIFIED BY MEANS OF ZIRCONIUM AND ALUMINUM COMPLEXES

[75] Inventors: Giovanni Burrafato, Tavazzano; Stefano Carminati, Seriate, both of Italy

[73] Assignees: Eniricerche S.p.A.; AGIP S.p.A., both of Milan, Italy

[21] Appl. No.: 106,634

[22] Filed: Aug. 16, 1993

[30] Foreign Application Priority Data

May 7, 1993 [IT] Italy ................... MI93A0918

[51] Int. Cl.$^6$ ................... C09K 7/02
[52] U.S. Cl. ................... 507/103; 507/138; 507/139; 507/140
[58] Field of Search ................... 507/140, 141, 507/145, 138, 139, 103; 166/305.1

[56] References Cited

U.S. PATENT DOCUMENTS

| | | |
|---|---|---|
| 3,762,485 | 10/1973 | Chesser ................... 507/140 |
| 3,843,524 | 10/1974 | Perricone et al. ................... 507/140 |
| 4,986,356 | 1/1991 | Lockhart et al. . |
| 5,100,932 | 3/1992 | Lockhart et al. . |
| 5,131,469 | 7/1992 | Lockhart et al. . |
| 5,132,029 | 7/1992 | Lockhart et al. . |
| 5,143,958 | 9/1992 | Lockhart et al. . |
| 5,219,476 | 6/1993 | Lockhart et al. . |

FOREIGN PATENT DOCUMENTS

| | | |
|---|---|---|
| 0565187 | 10/1993 | European Pat. Off. . |
| 2120224 | 11/1983 | United Kingdom . |

*Primary Examiner*—Philip Tucker
*Attorney, Agent, or Firm*—Oblon, Spivak, McClelland, Maier & Neustadt

[57] ABSTRACT

Aqueous drilling muds are disclosed which contain, as fluidifier agent, one or more complexes, which may be either pre-formed or produced in situ, selected from:

tetravalent zirconium and one or more organic acids, or their salts, having the general formula (I)

$$R_1 - \underset{\underset{R_2}{|}}{\overset{\overset{COOH}{|}}{C}} - OH \quad \quad (I)$$

wherein $R_1$ and $R_2$, which may be the same or different from each other, represent —H, —COOH, —CH$_3$, —CH$_2$COOH, —CH(OH)COOH;

aluminum citrate.

5 Claims, No Drawings

AQUEOUS DRILLING MUDS FLUIDIFIED BY MEANS OF ZIRCONIUM AND ALUMINUM COMPLEXES

The present invention relates to aqueous drilling muds which are constituted by an aqueous dispersion of clays containing, as the dispersant agent, a complex selected from particular zirconium complexes and aluminum citrate.

The aqueous drilling muds are often constituted by aqueous suspensions of clays, in particular bentonite, fluidified with dispersant agents or fluidifiers, for the purposes of preventing that during the drilling operations excessive increases occur in viscosity, yield stress and gel strength. The above said aqueous muds can possibly contain also other types of additives, with the most widely used of them being filtrate reducer agents and thickening agents.

By "dispersant agents (or fluidifier agents)", those substances are meant which are capable of reducing the viscosity of the mud, both initially and during the use thereof.

Among those causes which may cause an increase in viscosity, the high-temperature hydration of bentonite, an increase in suspended solid matter concentration, the coagulation caused by entering metal ions or salts, the degradation of other organic derivatives contained in the mud, can be cited.

Among the main fluidifier agents for muds, lignosulfonates fall, which are byproducts deriving from the sulfite process for separating the cellulosic from the ligninic portion of wood.

The effectiveness of these fluidifiers at high temperatures can be improved in the presence of such metals, as chromium, zinc or titanium, as disclosed in U.S. Pat. No. 2,953,473. In any cases, also the above said lignosulfonates lose their fluidifier properties at approximately 120°–140° C. The properties of the system can be restored, or, at minimum, this degradation process can be delayed by means of the addition of sodium chromate.

Other fluidifiers, more suitable for high-temperature processes, are lignites, a material of fossil nature mainly constituted by humic acids, which are water soluble in their salified form. Lignites can be used as sodium or potassium salts, or they can be simply admixed with chromium (U.S. Pat. No. 3,766,229).

The prior art supplies a range of indications in order to improve the dispersant properties of lignites, for example, by means of the reaction with chromium-(VI) salts, at 80° C., as disclosed in U.S. Pat. No. 3,956,142, or with such trivalent chromium salts, such as $CrCl_3 \cdot 6H_2O$, $Cr(CH_3COO)_3$.

The lignitic or ligninic products can be further modified or replaced by sulfoalkylated tannins. The latter, the preparation of which is disclosed in U.S. Pat. No. 3,537,991, derive from the reaction of a tannin with a carbonylic compound and sulfurous acid, or its salts, in an alkaline aqueous media. EP-A-331,158 discloses an additive for drilling muds, which comprises a sulfoalkylated tannin and Cr-(III) or Cr-(II) acetate, possibly in the presence of a lignite.

Other additives which are often used as fluidifier agents for aqueous muds are synthetic polymers, e.g., polyacrylates. U.S. Pat. No. 3,898,037 discloses copolymers of 2-acrylamido-2-methylpropane sulfonic acid (AMPS) with other monomers, in particular acrylic acid. Copolymers of AMPS with acrylic acid are also disclosed in U.S. Pat. No. 4,450,013 and EP-A-0108842.

In U.S. Pat. No. 3,730,900, the use is proposed of copolymers of styrenesulfonic acid and maleic anhydride having molecular weights comprised within the range of from 1000 to 5000, and in U.S. Pat. No. 3,764,530 several polymers of acrylic acid are disclosed.

All muds admixed with the above said fluidifiers display drawbacks.

So, lignosulfonates undergo decomposition with temperature, and, furthermore, they are often used together with salts of chromium, which is known to be a very toxic element.

Lignites are more heat stable than lignosulfonates, but also they are often used together with chromium salts.

In any cases, all these dispersants suffer from the disadvantage that they must be added to the drilling mud in large amounts, generally comprised within the range of from 0.5 to 1.5%, and larger, based on mud.

Furthermore, the performance of the above said dispersants are constrained to decidedly basic pH values.

Polyacrylates are particularly resistant to temperature, but they display the serious drawback that they cannot be used in the presence of divalent cations.

The present Applicant has found now that aqueous drilling muds can be fluidified with minor amounts of particular complexes selected from among some zirconium complexes and aluminum citrates. In that way, non-polluting drilling muds can be produced, because they are free from such toxic metals as chromium, and are useable within wide ranges of temperature and pH values.

In accordance therewith, the present invention relates to a composition of aqueous drilling muds on clay basis containing, as the fluidifier agent, one or more complexes, which can be either pre-formed or formed in situ, between multivalent metal ions and ligands, said complexes being selected from:

(a) complexes of tetravalent zirconium and one or more ligands selected from among organic acids having the general formula (I)

wherein $R_1$ and $R_2$, which may be the same or different from each other, represent —H, —COOH, —$CH_3$, —$CH_2COOH$, —CH(OH)COOH; or their salts;

(b) a complex of aluminum and citric acid; or salts thereof;

with the molar ratio of metal ion to ligand being comprised within the range of from 1:0.5 to 1:4.

In the preferred embodiment, the clay used for the aqueous drilling muds is bentonite. The fluidifier agents according to the present invention can be used as well in those cases when the drilling muds are constituted by polymeric solutions; in this case, the fluidifier agents according to the present invention are useful for dispersing any possible clay debris incorporated during the drilling.

As those skilled in the art are well aware of, the composition of drilling muds according to the present invention can contain further additives performing different functions, e.g., filtrate reducers or thickeners.

The zirconium complexes according to the present invention may also include one or more hydroxide or oxygen-containing species (and tetravalent zirconium may be present as zirconyl ion), or still other species not essential for the complex, such as, e.g., water molecules.

It is essential that the complexed multivalent metal is selected from zirconium and, limitedly to citric acid, aluminum. In fact, complexes between acids of general formula (I) and such a multivalent metal as chromium, are not as effective, when used as fluidifier agents.

In particular, zirconium complexes are more effective in those cases when the drilling muds must withstand high temperatures, whilst aluminum citrate is more suitable for lower temperatures, i.e., approximately 10°–80° C. Of course, also mixtures of complexes of aluminum and zirconium can be used.

Also essential is that the zirconium complexing agent is selected from those falling within the scope of general formula (I), and aluminum complexing agent is citric acid. The present Applicant will demonstrate in fact, that different zirconium complexing agents, such as oxalic acid, acetic acid, hydrochloric acid, are not as effective fluidifier agents and that, among aluminum complexes, only citrate complex is effective.

The compounds of general formula (I) for zirconium, and citric acid for aluminum, can be in their acidic or salified forms, with the counter-ion being unimportant for the properties of the complex. However, it is preferable that the complexing agent is either in acidic form, or partially or totally salified with alkali or alkaline-earth metals, or with ammonium.

For exemplifying purposes, useful for the practicing of the present invention are tetravalent zirconium complexes, as such or salified, with lactic acid [$R_1$ and $R_2$ in formula (I) are —H and —$CH_3$], citric acid ($R_1$ and $R_2$, which are the same, are —$CH_2COOH$), tartaric acid [$R_1$ and $R_2$ are —H and —CH(OH)COOH], glycolic acid ($R_1$ and $R_2$, which are the same, represent —H), and malic acid ($R_1$ and $R_2$ are —H and —$CH_2COOH$).

Whilst aluminum titrate is a commercial product available for the market, the complexes of tetravalent zirconium according to the present invention can be prepared according to several methods described in scientific literature. For example, A. N. Ermakov et al. report on the preparation of tetravalent zirconium complexes with some acids of general formula (I) [Russian Journal of Inorganic Chemistry Vol. 12 (10), 1967, page 1437].

According to these techniques, one may start from zirconyl chloride or acetate in aqueous solution, add the ligand of general formula (I) and precipitate, with a suitable non-solvent, for example acetone, under acidic pH conditions, the zirconium complexes, wash them and dry them.

According to an alternative route, the above said complexes can be isolated by precipitation, e.g., with ethanol, from aqueous solutions of $ZrOCl_2.8H_2O$ and ligand, adjusted at a pH value of about 10 with NaOH.

According to an embodiment of the present invention, the above said tetravalent zirconium complex with the acid of general formula (I) or aluminum citrate is separately prepared; according to the type of ligand, the molar ratio of the complexing agent to the multivalent metal ion is comprised within the range of from 0.5:1 to 4:1.

The pre-formed complex (or a salt thereof) is subsequently added to the base mud, or vice-versa; by the term "base mud", an aqueous dispersion of clays, preferably bentonite, is understood, which may possibly contain baryte and other non-fluidifier additives contained in the usual drilling muds, among which, mainly, thickeners and filtrate reducers.

According to another embodiment of the present invention, the pre-formed complex and an excess of ligand can be added to the base mud, until a total molar ratio of ligand to multivalent metal ion of 8:1 is reached, with the optimal excess being a function of the type of ligand [ligands of general formula (I) for zirconium and citric acid for aluminum], of the metal ion (zirconium or aluminum) and of the drilling mud operating temperature.

In any cases, the complexes, or their salts, according to the present invention, can be added to the base mud as such, or as an aqueous solution or dispersion, or pre-mixed with another additive, preferably as an aqueous solution.

According to a still other embodiment of the present invention, to the base mud one or more acids —or their salts—are added, preferably as an aqueous solution, which are selected from among the ligands of general formula (I) for zirconium, and citric acid for aluminum, and a whatever salt of zirconium or aluminum (for example, sulfate, nitrate, acetate). In such a way, the complexes, or mixtures of complexes, of zirconium and aluminum according to the present invention, are formed in situ. The molar ratio of the ligand or ligand mixture to zirconium or aluminum salt is comprised within a range of from about 0.5:1, up to a value of about 8:1.

For example, glycolic acid is effective even when it is used in a molar ratio to zirconium salt of about 6:1.

It is important that the so admixed mud is vigorously stirred for at least some minutes, in order to adequately homogenize it.

The complexes according to the present invention, whether pre-formed or formed in situ, are added to the base mud in variable amounts, as a function of various parameters, such as the acid (I) structure, the type of mud, the conditions met during the well bore drilling. However, in general, the amount of above said complexes, expressed as metal, is comprised within the range of from 0.4 mg to 700 mg per each 100 grams of mud.

In the case when a zirconium complex is used, said complex is preferably present in a drilling mud in an amount, expressed as $Zr^{+4}$, ion grams, comprised within the range of from 5 to 200 mg per each 100 grams of mud. In the case of low-clay-content muds, an amount of Zr complex is preferably used which is comprised within the lower region of the above said range. Obviously, in the case of high clay muds, an amount of Zr complex is preferably used which falls within the upper region of said range.

For example, in the case when zirconium citrate is used, the amount of complex present in the mud is comprised within the range of from 1.5 mg to 400 mg of zirconium citrate per each clay gram (in terms of $Zr^{+4}$, of from 0.4 mg to 108 mg of zirconium per each gram of clay).

When the metal is zirconium, the so admixed mud is still fluid even at temperatures of about 200° C., and furthermore is stable even in the presence of salt.

Should the rheological properties undergo a decay owing to a long time of use at high temperatures, the desired fluidity characteristics can be restored by means of further additions of the complex of $Zr^{+4}$ [or of a zirconium salt and one or more acids of general formula (I)].

As regards aluminum citrate, it is preferred that it is present in the drilling mud in an amount, expressed as an aluminum content, comprised within the range of from 1 to 80 mg per 100 g of mud.

In the case of low clay muds, an amount of aluminum citrate should be preferably used which falls within the lower region of the above said range. Of course, for high clay content muds, an amount of aluminum citrate which is comprised within the top region of said range should preferably be used.

Relatively to clay, aluminum citrate is present in an amount comprised within the range of from 15 to 150 mg per gram of clay, equivalent to an aluminum content of from 1 to 11 mg per each clay gram.

The performance of so formulated muds is often higher than of muds admixed with iron-chromium lignosulfonates and/or sodium or chromium lignites, which to date have been regarded as being the only non-synthetic fluidifier additives also effective at high temperatures.

According to the present invention, the environmental pollution problem caused by the presence of chromium in the muds known from the prior art can furthermore be effectively solved. In fact, by using the complexes of $Zr^{+4}$ according to the present invention, totally chromium-free muds can be prepared which are effective at high temperatures. For lower operating temperatures, aluminum citrate can be effectively used.

Finally, the muds according to the present invention can be used at pH values ranging from slightly acidic (pH>5), up to strongly basic (pH 10–11).

When the muds according to the present invention are used at an approximately neutral pH value, a further advantage derives which consists in said muds being less aggressive towards the sandface clays.

When a basic mud (pH 10–11) fluidified with an aqueous alkaline solution of zirconium complex (which may be either pre-formed or formed in situ), the rheological characteristics of the mud remain practically unchanged at room temperature, and even improve during the course of the use with aged mud.

Obviously, according to the desired fluidity conditions and of the well bore operating conditions, a suitable combination of zirconium complexes and citrate aluminum can be advantageously used.

The following examples are reported in order to better illustrate the present invention.

EXAMPLES

The rheological properties of the fluids have been measured at room temperature before and after ageing, by using a FANN 35SA viscosity with R1F1B1 equipment by following the procedure as reported in API standards RP 13B-1.

Before carrying out the rheological measurements on the aged samples, these were submitted to a 5-minute stirring, always using a "Hamilton Beach" stirrer.

Fann viscometer is constituted by two coaxial cylinders, the outermost of which can revolve at a constant revolution speed, between which cylinders the fluid is contained, the rheological properties of which are to be measured. The viscosity of the fluid produces a twisting torque applied to the internal cylinder, the revolving on which is prevented by a torsion bar. A pointer connected with the internal cylinder records the shift from a zero value, thus supplying a reading which is proportional to the viscosity of the fluid.

The apparent viscosity (AV), expressed as mPa.s is even by the reading divided by 2, with the revolution speed of the external cylinder being of 600 rpm.

The plastic viscosity (PV), expressed as mPa.s is given by the reading at a revolution speed of 600 rpm, less the reading at a revolution speed of 300 rpm.

The yield point (YP), expressed as Pascal, is given by the apparent viscosity less the plastic viscosity.

The value of gel strength at 10 seconds (GEL), expressed as Pascal units, is determined by stirring the fluid at a high revolution speed for 30 seconds, letting the fluid resting for a further 10 seconds, and finally recording the maximal reading at a revolution speed of 3 rpm. The "gel value at 10 minutes" is measured according to the same procedure, but the fluid being kept resting for 10 minutes before the measurement at 3 rpm is carried out.

EXAMPLE 1

In Table 1, the drilling mud fluidifier properties are reported with reference to drilling muds constituted by bentonite in water and admixed with zirconium complexes. The above said complexes were prepared in situ, by mixing in water the ligand of general formula (I), in its acidic form, and zirconyl chloride. The strongly acidic aqueous solution is admixed with an aqueous dispersion of bentonite, with a mud containing 6.5% by weight of bentonite being obtained, and the pH value of the resulting mud is finally adjusted at the value reported in the following Table. The complex amount (as computed as zirconium) is constant, and results to be of $5\times10^{-3}$ mols of zirconium per mud kg.

The rheological data relate to measurements carried out at room temperature on bentonite dispersions in water, on the same dispersions admixed with various zirconium complexes, and on the relevant muds aged at 120° C. for 16 hours.

TABLE 1

| Zr Complexes | Zr/I mols | AV mPas | PV mPas | YP PA | Gel (Pa) 10 sec | Gel (Pa) 10 min | pH |
|---|---|---|---|---|---|---|---|
| — | — | 23/40 | 16/23 | 7/17 | 3/5 | 14/18 | 10.1/7.9 |
| Citric | 1/1 | 15/18 | 13/16 | 2/2 | 0/0 | 0/0.3 | 10.0/8.3 |
| Tartaric | 1/2 | 14/16 | 13/15 | 1/1 | 0.3/0.3 | 7/1.5 | 10.1/8.1 |
| Malic | 1/2 | 14/17 | 14/13 | 0/4 | 0/0 | 0/0.2 | 9.9/7.9 |
| Lactic | 1/2 | 17/21 | 14/13 | 3/8 | 0.5/8 | 7/15 | 7.1/8.3 |

The data reported in Table 1 demonstrate that all muds admixed with the zirconium complexes according to the present invention are more fluid, relatively to the base mud, both before and after ageing.

In the case of lactic acid, the initial pH value should be close to neutrality in order to prevent mud from undergoing gelation.

EXAMPLE 2

In Table 2 the rheological properties are reported of other muds admixed with the zirconium complexes according to the present invention. In this case, the complexes are prepared in situ by mixing in water the proper amount of the ligand of general formula (I) in its acidic form, and zirconyl chloride.

Before being added to the base mud, the above said aqueous solutions are alkalified up to pH 10. The complex with citric acid No. 1 (ZrC1) was prepared by starting from zirconyl chloride, complex No. 2 (ZrC2) from zirconium acetate, whilst the zirconium complex with malic acid (ZrM) was prepared from zirconyl chloride. The muds were then submitted to 16-hour ageing at 120° C. In Table 2, "ZrI" indicates the zirconium complexes with the ligand I, Zr/I indicates the molar ratio of zirconium salt to ligand I. Zirconium is present in the muds in an amount of $5*10^{-3}$ mols per mud kg.

TABLE 2

| ZrI | Zr/I | AV mPas | PV mPas | YP PA | Gel (Pa) 10 sec | Gel (Pa) 10 min | pH |
|---|---|---|---|---|---|---|---|
| — | — | 22/36 | 17/22 | 5/14 | 2/4.5 | 11/17 | 10.0/8.6 |
| ZrC1 | 1/1 | 22/29 | 13/22 | 9/7 | 9/2 | 16/9 | 10.2/8.6 |
| ZrC$_2$ | 1/2 | 22/31 | 14/24 | 8/7 | 8/1.5 | 15/9 | 10.0/8.6 |
| ZrM | 1/2 | 20/26 | 13/21 | 7/5 | 5/1.5 | 11/7 | 9.9/8.4 |

The rheological characteristics before ageing are very close to those of the base mud.

Furthermore, no differences exist between the zirconium citrate complexes prepared by starting from zirconium acetate and those prepared by starting from zirconyl chloride. After ageing, in general, all complexes are effective for reducing the values of apparent viscosity, plastic viscosity, yield point (YP), and gel strength.

EXAMPLE 3

In Table 3, the rheological properties are reported of muds admixed with solution of zirconium glycolate containing various ratios of zirconium to glycolic acid. The strongly acidic aqueous solution is admixed with pristine mud. The end zirconium amount is the same in all muds and is of 0.005 mols per mud kg. The muds are aged for 16 hours at 120° C.

TABLE 3

| Zr/glycolic ac.mol.ratio | AV mPas | PV mPas | YP PA | Gel (Pa) 10 sec | 10 min | pH |
|---|---|---|---|---|---|---|
| 0/0 | 22/36 | 17/22 | 5/14 | 2/4.5 | 11/17 | 10.1/8.6 |
| 1/1 | 18/20 | 15/13 | 3/7 | 1/7 | 9/11 | 10.0/8.2 |
| 1/2 | 16/19 | 14/14 | 2/5 | 0.3/5 | 4/10 | 10.1/8.1 |
| 1/6 | 14/12 | 14/10 | 0/2 | 0.3/2.5 | 18/5 | 9.8/7.8 |
| 1/10 | nm/— | nm/— | nm/— | nm/— | nm/— | 10.0/9.9 |

The code "nm" means that the rheological properties of the mud cannot be correctly measured by means of the FANN 35 viscometer, owing to an excessive gelation of the mud. The data reported in Table 3 demonstrate that up to a molar ratio of zirconium to glycolic acid of 1:6, the complexes display fluidifier capabilities. In the case of the ratio of 1:10, a massive gelation takes place which does not enable a reliable rheological measurement to be carried out with the FANN 35 viscometer. After ageing at 120° C. for 16 hours, the fluidifier effect is still more evident and a strict correlation can be observed between the improvement in mud performance and the increasing concentration of glycolic acid, up to the threshold value represented by the molar ratio of 1:10.

EXAMPLE 4

In Table 4, the rheological properties are reported of (both neutral and basic) muds admixed with zirconium citrate powder, prepared by precipitation with acetone from strongly acidic aqueous solution.

TABLE 4

| Zr citrate % | AV mPas | PV mPas | YP PA | Gel (Pa) 10 sec | 10 min | pH |
|---|---|---|---|---|---|---|
| — | 32/40 | 13/18 | 19/22 | 19/19 | 27/35 | 7.1/8.4 |
| 0.2 | 14/16 | 12/15 | 2/1 | 0/0 | 0/0.5 | 7.1/8.4 |
| — | 23/40 | 16/24 | 7/16 | 2/5 | 12/18 | 10.1/8.5 |
| 0.2 | 15/18 | 13/16 | 2/2 | 0.3/0 | 0.3/0 | 10.0/8.5 |
| 0.4 | 15/18 | 15/17 | 0/1 | 0.3/0 | 0.3/0 | 10.0/8.4 |

The complex of zirconium with citric acid extremely effective one as a fluidifier and gel strength reducer agent at room temperature and after ageing, both at nearly neutral and strongly basic pH values.

EXAMPLE 5

In Table 5 the rheological characteristics are reported of base muds admixed with variable amounts of zirconium citrate powder, as measured before and after ageing at 120° C. for 16 hours.

TABLE 5

| Zr citrate % | AV mPas | PV mPas | YP PA | Gel (Pa) 10 sec | 10 min | pH |
|---|---|---|---|---|---|---|
| — | 22/44 | 14/28 | 8/16 | 3.5/7 | 14/19 | 10.1/8.4 |
| 0.01 | 19/38 | 15/25 | 4/13 | 0.3/3.5 | 6/13 | 10.2/8.5 |
| 0.03 | 17/29 | 14/21 | 3/8 | 0/1 | 1/6 | 10.1/8.5 |
| 0.05 | 16/26 | 13/20 | 3/6 | 0/1 | 0.5/3.5 | 9.9/8.4 |
| 0.1 | 16/20 | 14/17 | 2/3 | 0.3/0.3 | 0.3/0.3 | 9.9/8.4 |
| 0.4 | 15/18 | 15/17 | 0/1 | 0.3/0.3 | 0.3/0.3 | 10.0/8.4 |
| 1.5 | 10/18 | 9/15 | 1/3 | 0/0 | 0/0.5 | 10.1/8.1 |

The data reported in Table 5 show that even at very low concentrations of zirconium citrate (equal to 0.01%, corresponding to about 1.5 mg of zirconium citrate per gram of clay), an improvement can be observed in the rheological characteristics of the mud.

EXAMPLE 6

The fluidifier effectiveness was then verified (Table 6) of the complexes according to the present invention in muds which, besides water and bentonite, also contained sodium chloride. Zirconium citrate (ZrC) was added in powder form.

The muds were aged 16 hours at 120° C.

TABLE 6

| ZrC % | NaCl % | AV mPas | PV mPas | YP PA | Gel (Pa) 10 sec | 10 min | pH |
|---|---|---|---|---|---|---|---|
| — | 0.6 | 70/63 | 16/17 | 54/46 | 40/38 | 43/51 | 10.0/8.1 |
| 0.2 | 0.6 | 13/19 | 12/17 | 1/2 | 0.3/0.3 | 1.5/0.3 | 10.0/8.1 |
| — | 2.8 | 41/50 | 9/17 | 32/33 | 20/32 | 20/34 | 10.2/7.7 |
| 0.8 | 2.8 | 18/34 | 6/12 | 12/22 | 8/12 | 10/13 | 10.0/8.0 |

The data reported in Table 6, demonstrate that even at high salt concentrations, the complexes according to the present invention secure considerably high fluidifier effect.

EXAMPLE 7

In Table 7, the rheological properties are reported of muds to which two complexes according to the present invention were added, and namely zirconium citrate (ZrC) added in powder form and zirconium malate (ZrM) in a molar ratio of Zr:malic acid of 1:2, added in aqueous solution at a basic pH value. The properties are reported of the muds as freshly prepared and after ageing under very severe conditions, i.e., at 180° C. for 16 hours.

TABLE 7

| Complex | Zr % | AV mPas | PV mPas | YP PA | Gel (Pa) 10 sec | 10 min | pH |
|---|---|---|---|---|---|---|---|
| — | — | 23/58 | 15/13 | 8/27 | 4/7 | 13/24 | 10.0/8.4 |
| ZrC | 0.05 | 16/27 | 15/24 | 1/3 | 0/0.3 | 0/0.5 | 9.9/8.4 |
| ZrM | 0.05 | 19/35 | 15/25 | 4/10 | 0.5/1 | 4/9 | 9.9/8.4 |

The data reported in Table 7 demonstrate the effectiveness of the complexes according to the present invention even at very high temperatures.

COMPARISON EXAMPLES 8 AND 9

In Tables 8 and 9, reference muds are reported to which complexes not according to the present invention were added. In particular, in Table 8 the properties are reported of muds admixed with chromium-(III) complexes, before and after ageing.

TABLE 8

| Cr Complex | % | AV mPas | PV mPas | YP PA | Gel (Pa) 10 sec | 10 min | pH |
|---|---|---|---|---|---|---|---|
| — | — | 20/38 | 15/24 | 5/14 | 1/5 | 9/17 | 10.0/8.7 |
| Nitrate | 0.20 | 117/17 | 25/11 | 91/6 | 57/4 | 60/8.5 | 10.5/8.7 |
| Acetate | 0.13 | 18/28 | 14/18 | 4/10 | 4/10 | 19/27 | 9.8/8.3 |
| Citrate | 0.2 | 18/33 | 14/20 | 4/13 | 3/8 | 11/17 | 10.4/8.4 |
| Glicolate | 0.19 | 29/26 | 14/19 | 15/7 | 19/5 | 26/16 | 10.1/8.2 |
| Malate | 0.24 | 25/29 | 16/19 | 9/10 | 12/10 | 20/30 | 10.1/8.2 |
| Oxalate | 0.22 | 30/25 | 14/20 | 16/5 | 20/1.5 | 28/11 | 10.3/8.6 |

Table 8 displays how all chromium complexes, whether falling within the scope of the general formula (I) or not, added to the base mud in such amounts as to yield a constant chromium content ($5*10^{-3}$ mols per mud kg) do not act as fluidifiers for the base mud at room termperature. Some complexing agents (citrate and acetate) keep the mud properties unchanged after high-temperature ageing, whilst all other agents even worsen the properties of the base mud.

In table 9, the rheological properties are finally reported of muds admixed with zirconium complexes not falling within the purpose of the general formula (I). Metal concentration was still of $5*10^{-3}$ mols per mud kg.

TABLE 9

| Complex | AV mPas | PV mPas | YP PA | Gel (Pa) 10 sec | 10 min | pH |
|---|---|---|---|---|---|---|
| — | 20/38 | 13/25 | 7/13 | 2/5 | 11/17 | 10.2/8.6 |
| Zr chloride | 34/29 | 13/15 | 21/14 | 33/9.5 | 44/17 | 10.2/8.5 |
| Zr acetate | 33/34 | 17/18 | 16/16 | 24/16 | 33/23 | 10.0/8.6 |
| Zr oxalate | 23/30 | 17/17 | 6/13 | 4/10 | 15/17 | 10.1/8.5 |

From the data of table 9, it may be observed that all the above reported zirconium complexes worsen the rheological properties at room temperature.

After ageing, all complexes of Table 9 not only slightly reduce the values of plastic viscosity and apparent viscosity, but they even worsen, relatively to the base mud, the "Yield point" and "Gel" values.

One may hence conclude that the complexes of Table 9 are not effective in controlling the fluidity characteristics of the muds.

EXAMPLE 10

In Table 10, the rheological parameters are reported of muds containing 6.5% by weight of bentonite, admixed with different amounts of preformed aluminum citrate (AlC), before and after 16-hour ageing at 80° C.

TABLE 10

| AlC % | AV mPas | PV mPas | YP PA | Gel (Pa) 10 sec | 10 min | pH |
|---|---|---|---|---|---|---|
| — | 20/32 | 15/21 | 5/11 | 2/4 | 12/13 | 10.0/8.8 |
| 0.2 | 18/27 | 13/17 | 5/10 | 1/3.5 | 17/15 | 9.9/8.7 |
| 0.4 | 12/18 | 11/14 | 1/4 | 0.5/2 | 14/14 | 9.9/9.1 |
| 0.8 | 9/27 | 9/13 | 0/3 | 0.3/5 | 4/23 | 9.9/9.9 |

From the data reported in Table 10, it can be observed that by increasing aluminum citrate concentrations, the room-temperature rheological characteristics are parallelly improved as well. After low-temperature ageing, the muds containing high concentrations of aluminum citrate undergo a marked decay, whilst those muds which contain intermediate amounts of the same aluminum citrate retain practically unchanged rheological characteristics.

EXAMPLE 11

In this Example (Table 11), the rheological characteristics are reported of muds containing 6.5% of bentonite, containing aluminum citrate (AlC) prepared in situ from aluminum sulfate and citric acid (both soon after preparation, and after 16-hours ageing at 80° C.). The strongly acidic aqueous solution containing the in situ formed complex is added to the base mud which is subsequently alkalified. For comparison purposes, the rheological data are reported of muds admixed with aluminum glycolate (AlGl), which do not fall within the scope of the present invention.

In the above said Table, at the side of the aluminum complex, the molar ratio of aluminum to complexing agent is reported. The aluminum amount ($10^{-2}$ mols per mud kg) is constant in all muds.

TABLE 11

| Complex | | AV mPas | PV mPas | YP PA | Gel (Pa) 10 sec | 10 min | pH |
|---|---|---|---|---|---|---|---|
| — | — | 20/32 | 14/21 | 6/11 | 2/3.5 | 14/14 | 10.3/8.7 |
| AlC | 1/0.5 | 12/19 | 10/14 | 2/5 | 1/2.5 | 19/17 | 10.1/9.3 |
| AlC | 1/1 | 14/18 | 10/13 | 4/5 | 1/2.5 | 37/11 | 10.0/8.7 |
| AlGl | 1/0.5 | 96/34 | 10/5 | 86/29 | nm/53 | nm/63 | 9.9/8.9 |
| AlGl | 1/1 | 88/35 | 16/3 | 72/32 | nm/31 | nm/38 | 9.9/9.2 |

Table 11 displays that only aluminum titrate shows fluidifier properties. After low temperature ageing (80° C.), the rheological characteristics become better than of the base mud.

We claim:

1. A composition of aqueous drilling muds on clay basis containing, as the fluidifier agent, one or more complexes, which can be either pre-formed or formed in situ, between multivalent metal ions and ligands, said complexes being selected from:

(a) complexes of tetravalent zirconium and one or more ligands selected from among organic acids having the formula (I)

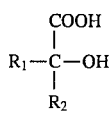

wherein $R_1$ and $R_2$, which may be the same or different from each other, represent —H, —COOH, —CH$_3$, —CH$_2$COOH, —CH(OH)COOH; or their salts, in an amount from 0.005 to 0.2 grams of zirconium per each 100 grams of mud;

(b) a complex of aluminum and citric acid; or salts thereof, in an amount from 0.001 to 0.08 grams of aluminum per each 100 g of mud;

with the molar ratio of metal ion to ligand being within the range of from 1:0.5 to 1:4.

2. Mud composition according to claim 1, in which the ligands for zirconium or aluminum are in acidic form.

3. Mud composition according to claim 1, in which the ligands for zirconium or aluminum are partially or totally salified with alkali or alkaline-earth metal ions or ammonium ions.

4. Drilling mud composition according to claim 1, additionally containing an excess of one or more ligands until a total molar ratio of ligand to metal ion of 8:1 is reached.

5. Aqueous drilling mud composition according to claim 1, in which said clay is bentonite.

* * * * *